United States Patent [19]

Steinman et al.

[11] Patent Number: 4,600,838

[45] Date of Patent: Jul. 15, 1986

[54] METHODS AND APPARATUS FOR MEASURING THERMAL NEUTRON DECAY CHARACTERISTICS OF EARTH FORMATIONS

[75] Inventors: Donald K. Steinman, Missouri City; Larry A. Jacobson, Richmond, both of Tex.

[73] Assignee: Schlumberger Technology Corporation, Houston, Tex.

[21] Appl. No.: 633,155

[22] Filed: Jul. 20, 1984

[51] Int. Cl.$^4$ .............................................. G01V 5/00
[52] U.S. Cl. ...................................... 250/270; 250/262
[58] Field of Search ....................... 250/256, 270, 262

[56] References Cited

U.S. PATENT DOCUMENTS

| | | | |
|---|---|---|---|
| 3,868,505 | 2/1975 | Jacobson et al. | 250/269 |
| 4,046,764 | 9/1977 | Marquis | 250/270 |
| 4,232,220 | 11/1980 | Hertzog | 250/270 |
| 4,292,518 | 9/1981 | Johnstone | 250/262 |
| 4,317,034 | 2/1982 | Randall | 250/262 |
| 4,350,888 | 9/1982 | Peelman | 250/270 |
| 4,385,235 | 5/1983 | Hastings | 250/270 |
| 4,388,529 | 6/1983 | Peelman | 250/270 |
| 4,409,481 | 10/1983 | Smith, Jr. et al. | 250/270 |
| 4,424,444 | 1/1984 | Smith, Jr. et al. | 250/270 |

OTHER PUBLICATIONS

"Welex Thermal Multigate Decay Logging", Welex, 3-1983, brochure.
"Computing Thermal Neutron Decay Time Environmental Effects Using Monte Carlo Techniques," Preeg and Scott, 10-1981, SPE Paper #10293.

*Primary Examiner*—Alfred E. Smith
*Assistant Examiner*—Richard Hanig

[57] ABSTRACT

Methods for measuring thermal neutron decay characteristics of earth formations include the steps of irradiating an earth formation with a discrete burst of fast neutrons, detecting indications of thermal neutron concentration in the formation during a sequence of discrete time gates, determining the zeroth order moment of the indications during the sequence of discrete time gates, and determining the first order moment of the indications during the sequence of discrete time gates, in order to obtain the desired thermal neutron decay characteristic of the earth formation.

21 Claims, 4 Drawing Figures

4,600,838

METHODS AND APPARATUS FOR MEASURING THERMAL NEUTRON DECAY CHARACTERISTICS OF EARTH FORMATIONS

FIELD OF THE INVENTION

The invention relates to methods and apparatus for determining thermal neutron decay characteristics of earth formations, and in particular to methods and apparatus for determining the thermal neutron decay time constants of earth formations, and related formation capture cross-sections traversed by a well bore.

DESCRIPTION OF THE PRIOR ART

Heretofore, pulsed-neutron capture logs have provided measurements of thermal neutron capture characteristics of earth formations; e.g., thermal neutron decay time constant ($\tau$) and its correlative macroscopic capture cross-section ($\Sigma$), which have proven useful in differentiating between oil or gas-bearing formations and water-bearing formations. Such logs are especially useful in recognizing the presence of hydrocarbons in cased formations, and to detect changes in water saturation during the production life of a well.

Thermal neutron characteristic measurements are typically made by irradiating a formation which bursts of fast (e.g. 14 Mev) neutrons and following the decay of the thermal neutron concentration in the formation by counting the gamma rays emitted by formation nuclei upon the capture of thermal neutrons during discrete time intervals, or gates, following each neutron burst.

Various methods have been suggested to determine the foregoing thermal neutron decay characteristics. For example, U.S. Pat. No. 4,409,481, to Harry D. Smith, Jr., et al, issued Oct. 11, 1983, utilizes an iterative least squares fitting technique to obtain the desired thermal neutron decay characteristic. In U.S. Pat. No. 4,385,235, issued to Mark W. Hastings, on May 24, 1983, a time averaging, or gate ratio, technique is utilized to obtain the desired thermal neutron decay characteristic. Disadvantages associated with such techniques are that the gamma ray count rate measurements may be overly subject to excessive statistical variations, particularly in short decay time formations; the values of the thermal neutron decay characteristics determined may be overly subject to background noise or statistical fluctuations which affect the accuracy of the values determined for the thermal neutron decay characteristics; and such methods may require an undesirable amount of time to arrive at the determination of the thermal neutron decay characteristic. Further, with respect to utilizing a least squares fitting dependent upon the thermal neutron decay characteristics of the earth formation. Often an iterative least squares analysis of two nearly identical data sets will result in significantly different values for the thermal neutron decay time constant.

Accordingly, prior to the development of the present invention, there has been no method for determining thermal neutron decay characteristics of earth formations which: is not overly subject to excessive statistical variations, particularly in short decay time formations; is less immune to background noise and statistical fluctuations in the data and thus provides more precise and accurate determinations of the thermal neutron decay characteristics; provides a relatively faster analytic determination of the desired thermal neutron decay characteristic, which analytic determination does not become unstable. Therefore, the art has sought a method for determining thermal neutron decay characteristics of earth formations which is: more immune to noise and statistical fluctuations; utilizes an analytic determination which is faster and does not lead to an unstable solution; and is not overly subject to excessive statistical variation, particularly in short decay time formations.

SUMMARY OF THE INVENTION

In accordance with the present invention, the foregoing advantages have been achieved through the present method for determining thermal neutron decay characteristics. One embodiment of the present invention includes the steps of: irradiating an earth formation with a discrete burst of fast neutrons; detecting indications of the thermal neutron concentration in the formation during a sequence of discrete time gates, the sequence of time gates beginning following a discrete time delay after the end of the neutron burst; determining the zeroth order moment of the indications during the sequence of discrete time gates; determining the first order moment of the indications during the sequence of discrete time gates; and forming a ratio of the first order moment of the indications during the sequence of discrete time gates to the zeroth order moment of the indications during the sequence of discrete time gates, to obtain the thermal neutron decay time constant of the earth formation.

A further feature of the present invention is that the indications of thermal neutron concentration in the formation are counts obtained in a detector in a logging tool; the zeroth order moment of the counts is the total number of counts detected during the sequence of discrete time gates; and the first order moment of the counts is the sum, over the sequence of discrete time gates, of the product of the counts in each discrete time gate and the mean time of each respective time gate.

In accordance with another embodiment of the invention, the foregoing advantages have also been achieved through the present method for determining thermal neutron decay characteristics of a borehole in a surrounding earth formation. One embodiment of the present invention includes the steps of: irradiating the borehole and the surrounding earth formation with a discrete burst of fast neutrons during each of a succession of irradiation intervals; detecting indications of the thermal neutron concentration in the borehole and formation during at least a first and second sequence of discrete time gates in each irradiation interval, said first sequence time gates beginning following a discrete time delay after the end of the neutron burst in said irradiation interval, and said second sequence of time gates beginning following a discrete time delay after the beginning of the first sequence of time gates; determining the zeroth order moments of the indications for each of the at least first and second sequences of time gates; determining the first order moments of the indications for each of the at least first and second sequences of time gates; adjusting the zeroth and first order moments of the indications for the second sequence of time gates by a correction factor determined from a preceding irradiation interval; and combining the zeroth and first order moments of the indications of the first sequence of time gates with the adjusted zeroth and first order moments of the indications of the second sequence of time gates according to a series of equations to obtain the thermal neutron decay characteristics of the borehole and surrounding earth formation.

A further feature of the present invention is that the indications of thermal neutron concentration in the borehole and surrounding earth formation are the number of neutrons counted by a neutron counter disposed in the borehole; the zeroth order moments are the total number of neutrons counted during each of the first and second sequences of discrete time gates; and the first order moments are the sum, over each of the first and second sequences of discrete time gates, of the product of the number of neutrons counted in each time gate and the mean time of each respective time gate.

In accordance with another embodiment of the present invention, the foregoing advantages have been achieved through the present method for determining thermal neutron decay characteristics of a borehole and a surrounding earth formation. One embodiment of the present invention includes the steps of: irradiating the borehole and the surrounding earth formation with a discrete burst of fast neutrons during each of a succession of irradiation intervals; detecting indications of the thermal neutron concentration in the borehole and formation during at least a first and second sequence of discrete time gates in each irradiation interval, said first sequence of time gates beginning following a discrete time delay after the end of the neutron burst in said irradiation interval, and the second sequence of time gates beginning following a discrete time delay after the beginning of the first sequence of time gates; determining and removing indications of background radiation from the at least first and second sequences of time gates; determining the zeroth order moments of the indications of each of the at least first and second sequences of time gates; determining the first order moments of the indications for each of the at least first and second sequences of time gates; selecting correction factors as a function of the length of the first and second sequences of discrete time gates and adjusting the zeroth order and first order moments of the indications for each of the at least first and second sequences of time gates by the correction factors; and combining the adjusted zeroth and first order moments of the indications of the first and second sequences of discrete time gates according to a series of equations to obtain the thermal neutron decay characteristics of the borehole and surrounding earth formation.

A further feature of the present invention is that the indications of thermal neutron concentration in the borehole and surrounding earth formation are counts obtained in a detector in a logging tool; the zeroth order moment of the counts for the first and second sequences of time gates is the total number of counts detected during each sequence of discrete time gates; and the first order moment of the counts for the first and second sequences of time gates is the sum, over all the time gates of each sequence, of the product of the counts in each discrete time gate and the mean time of each respective time gate. An additional feature of the present invention is that the second sequence of discrete time gates may begin during the first sequence of discrete time gates, and the second sequence of discrete time gates may begin approximately after the passing of two times the thermal neutron decay time constant after the discrete burst of fast neutrons.

The methods for determining thermal neutron decay characteristics of an earth formation of the present invention, when compared with previously proposed prior art techniques, has the advantages of providing a fast, stable, precise, analytic solution to obtain the desired thermal neutron decay characteristic; and is more immune to noise and statistical fluctuations.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
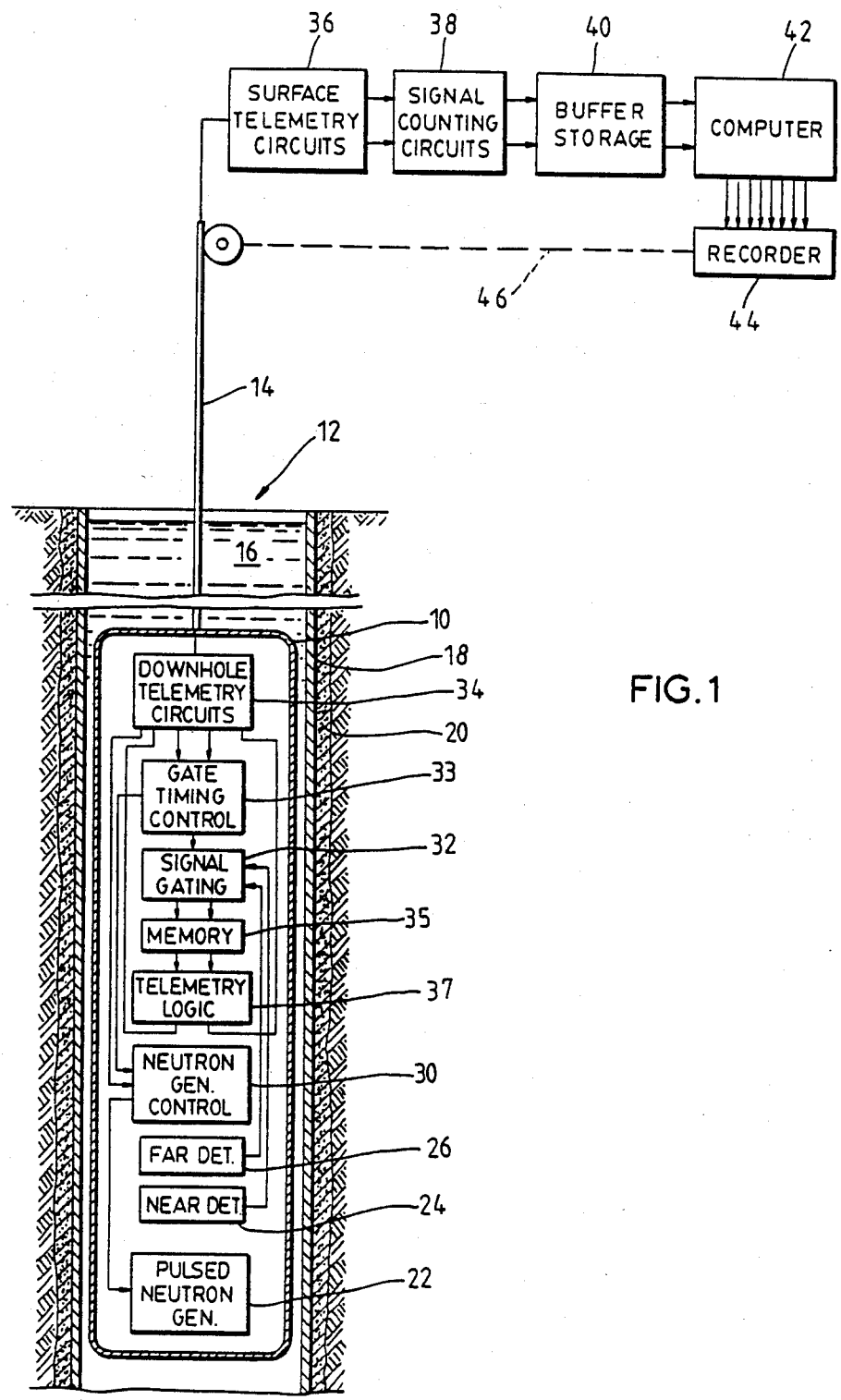
FIG. 1 is a schematic view of a representative well logging tool construction utilized in accordance with the present invention.

In the exemplary embodiment of FIG. 1, a well logging tool which is utilized in accordance with the present invention, includes a fluid-tight, pressure and temperature resistant sonde or tool 10 that is adapted to be suspended in and moved through a well bore, or borehole, 12 by an armored cable 14. The borehole 12 is illustrated as containing a borehole fluid 16 and as including a steel casing 18 and surrounding cement annulus 20. Although no tubing is shown in the borehole, the tool 10 may if desired, be sized for through-tubing use.

The downhole tool 10 includes a pulsed neutron generator 22 and two radiation detectors 24 and 26 that are located at different spacings from the neutron generator 22. Alternatively, as will be hereinafter described in greater detail, a neutron counter may be substituted for the two radiation detectors 24 and 26. For the purpose of the present invention, the neutron generator 22 is preferably of the type which generates discrete pulses of fast neutrons; e.g., 14 Mev, and may for example be of the type described in more complete detailed in U.S. Pat. No. 2,991,364, to C. Goodman, dated July 4, 1961, and U.S. Pat. No. 3,546,512 to A. H. Frentrop, dated Dec. 8, 1970. Operation of the neutron generator 22 is controlled in part by a neutron generator control circuit 30, and this circuit may also be of the types described in the aforementioned patents. The detectors 24 and 26 may be of any construction suitable for the detection of the thermal neutron concentrations, or gamma rays, in the surrounding each formation and to the production of a pulse signal in response to each detected gamma ray having an amplitude representative of the energy of the detected gamma ray. To that end, detectors 24 and 26 may be of the thermal neutron sensitive type; e.g., helium filled proportional counters, or of the gamma ray sensitive type, such as thallium-activated sodium iodide detectors. In the preferred embodiment, the detectors 24 and 26, and the related circuitry may be that disclosed in U.S. Pat. No. 4,223,218, issued Sept. 16, 1980, and commonly assigned to the assignee of this application. It will also be understood that other downhole power sources (not shown) are provided as required to drive the neutron generator 22 and other downhole circuits. Power for the well tool is supplied over the cable 14 from a surface power supply (not shown) as is conventional.

Output pulses from the near detector 24 and the far detector 26 representative of the concentration of thermal neutrons in the irradiated formation, are applied to signal gating circuits 32. The signal gating circuits 32 are controlled by gate timing circuits 33, which also control the operation of the neutron generator control circuit 30. From the signal gating circuits 32 the detector signals are counted and stored in memory circuits 35 and thence, under controlled telemetry logic circuits 37, are applied to downhole telemetry circuits 34 for transmission to the surface over the cable 14.

The downhole telemetry circuits 34 may be of any known construction for encoding, time division, multiplexing, or other preparing the data-bearing signals applied to them from the telemetry logic circuits 37 and for impressing such data on the cable 14. At the earth's surface the data-bearing signals from the detectors 24 and 26 are amplified, decoded, demultiplexed and otherwise processed as needed in the surface telemetry circuits 36, which may also be conventional.

Following circuits 36 the detector signals are separately counted in signal counting circuits 38 to acquire the thermal neutron decay curve data over a desired accumulation interval. Upon termination of the data combination time, the count rate data accumulated in the signal counting circuits 38 are transferred to buffers 40 and the signal counting circuits 38 are reset to zero.

From storage 40, the count rate data are processed in a computer 42, which suitably comprises a microprocessor, or alternatively, a general purpose digital computer such as that manufactured by Digital Equipment Corporation, Maynard, Mass., under the designation PDP-11, and specially modified, as by stored instructions to carry out the present invention. As is described more fully hereinafter, the computer 42 processes the count rate data from the respective detectors to develop various desired outputs, which may be recorded in conventional fashion as a function of tool depth in a recorder 44. The usual cable-following mechanical linkage, indicated diagrammatically at 46 in FIG. 1 is provided for this purpose.

Pulses from detectors 24 and 26 are accumulated in the foregoing appropriate circuitry and in order to generate count rate signals indicative of the neutrons detected per second by each of the individual detectors. For purposes of convenience, the signals generated by detectors 24 and 26, will hereafter be referred to in terms of count rates, but it will be recognized that the invention is not so limited. These signals are transmitted in a known manner with known equipment to the surface instrumentation via cable 14 after undergoing various degrees of signal processing and conditioning dependent upon the telemetry equipment provided in the sonde and at the surface.

Figure 2:
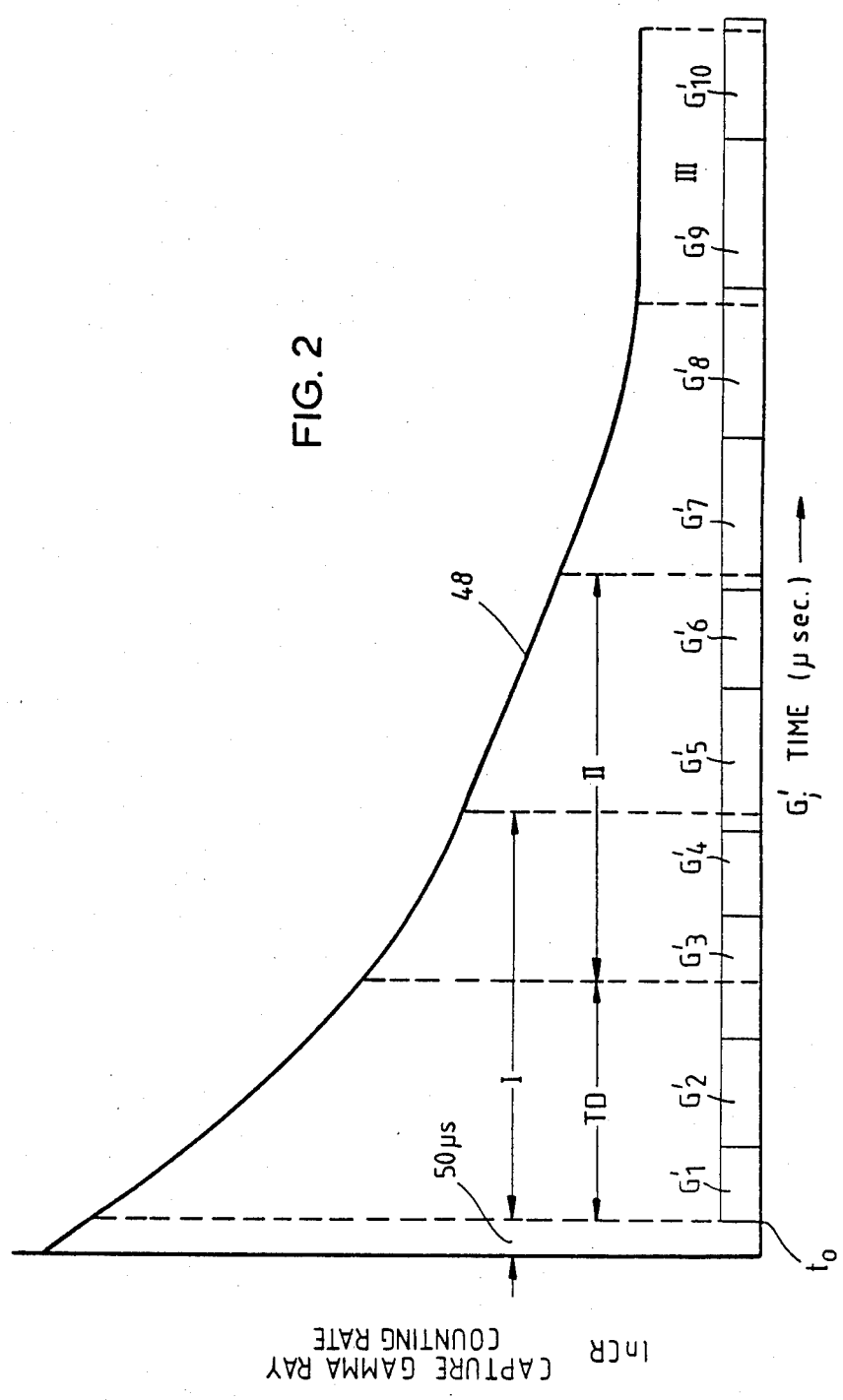
FIG. 2 is a graphical representation of an illustrative thermal neutron concentration decay curve and showing superimposed thereon, a preferred sequence and sequences of discrete time gates in accordance with the present invention.

With reference now to FIG. 2, a decay curve 48 graphically represents the variation with time of the logarithmic counting rate of thermal neutron capture gamma rays following irradiation of an earth formation. As is well known, the sloep of the thermal neutron decay curve 48 for an earth formation is indicative of the thermal neutron decay time constant $\tau$ of the formation, and the decay of neutrons after a neutron burst from the neutron generator 22 causes counts to be obtained in the detector of the logging tool 10 and the time behaviour thereof is exponential in accordance with Equation 1.

$$N(t-t_o) = Ae^{-(t-t_o)/\tau} \quad (1)$$

where: $N(t-t_o)$ is the instantaneous count rate at time t after $t_o$; $t_o$ is the starting time after the neutron burst from the neutron generator for the sequence of discrete time gates $G_1'-G_i'$ 22; A is the instantaneous count rate at $t_o$, or amplitude of the pulse signal produced in response to the detected indications of thermal neutron concentration, or gamma rays; and $\tau$ is the thermal neutron decay time constant, which can be related to the formation macroscopic capture crosssection, $\Sigma$, by Equation 2:

$$\tau = \frac{4550}{\Sigma} \quad (2)$$

As is known, the moments of a function of time, f(t) are defined mathematically as in Equation 3:

$$Mi = \int_0^\infty t^i f(t) dt \quad i = 0, 1, 2, 3 \ldots \quad (3)$$

For a curve, such as decay curve 48, characterized by a single exponential, the zeroth order moment is defined by Equation 4, and the first order moment of the curve is defined by Equation 5:

$$M_o = \int_0^\infty Ae^{-t/\tau} dt = A\tau \quad (4)$$

$$M = \int_0^\infty t Ae^{-t/\tau} dt = A\tau^2 \quad (5)$$

In terms of the logging tool 10 measurements, for a decay curve 48 characterized by a single exponential, the zeroth order moment is the total number of counts in the decay curve recorded after $t_o$ and is defined by Equation 6.

$$N = \int_0^\infty Ae^{-(t-t_0)/\tau} dt = A\tau \quad (6)$$

The first order moment is the sum of the times of the occurrence of the events in the decay curve from $t_o$ to $\infty$ and thus the moment of the total counts detected is defined by Equation 7.

$$M = \int_{t_0}^\infty (t - t_0)Ae^{-(t-t_0)\tau} dt = A\tau^2 \quad (7)$$

The indications of the thermal neutron concentration in the formation, are the counts detected by the detector during the sequence of discrete time gates $G_1'-G_i'$. The data obtained from the detector is grouped into such discrete time gates, the first order moment thus becomes the sum, over the sequence of discrete time gates, of the product of the counts in each discrete time gate and the mean time of each respective time gate. However, alternatively, the moment may be determined directly by summing the times of occurrence of each indication within each sequence from detectors 24 and 26, using suitable, conventional circuitry.

Thus, from Equations 4 and 5 or Equations 6 and 7, it is seen that by forming a ratio of the first order moment of Equations 4 or 6 to the zeroth order moment of Equations 5 or 7, the thermal neutron decay time constant of a formation having a decay curve characterized by a single exponential is defined by Equation 8:

$$\tau = \frac{M_I}{M_0} = \frac{M}{N} \tag{8}$$

Further, upon forming a ratio of 4550 to the thermal neutron decay time constant $\tau$ of the earth formation in accordance with Equation 9, which is obtained from Equation 2, the thermal neutron capture cross-section, $\Sigma$, of the earth formation may be obtained.

$$\Sigma = \frac{4550}{\tau} \tag{9}$$

Hereinafter, for clarity, the zeroth order and first order moments will be referred to as N and M respectively. In connection with tool 10, the zeroth order and first order moments, N and M, can be simply computed from the gate count rates provided by tool 10 in accordance with Equations 10 and 11:

$$N = \sum_{i=i_0}^{i_b} G_i \tag{10}$$

$$M = \sum_{i=i_0}^{i_b} \bar{t}_i G_i \tag{11}$$

In Equations 10 and 11 $G_i$ is the net count rate in the $i^{th}$ gate ($G_i'$), or gross counts minus background counts, $i_o$ is the starting channel, and $i_b$ is the first channel in which only background counts are recorded, and $\bar{t}_i$ is the average time positions of the counts in gate $G_i'$. $\bar{t}_i$ can be computed by a number of different means, and it is defined as set forth in Equation 12, where $t_i$ is the time at the beginning of the $i^{th}$ gate $G_i'$ relative to $t_o$ and $\Delta t$ is the duration of the gate.

$$\bar{t}_i = \frac{\int_{t_i}^{t_i+\Delta t} (t-t_0)e^{-(t-t_0)/\tau} dt}{\int_{t_i}^{t_i+\Delta t} e^{-(t-t_0)/\tau} dt} = t_i + \tau - \frac{\Delta t}{e^{\Delta t/\tau} - 1} \tag{12}$$

If $\tau >> t$ then:

$$\bar{t}_i \cong t_i + \frac{\Delta t}{2}.$$

As long as $\tau > \Delta t$, any of several approximations may be used to compute $\bar{t}_i$ with relatively good accuracy. For example, the approximation of equation 13 is correct to within 0.23% when $\Delta t = \tau$.

$$\bar{t}_i \cong t_i + \frac{\Delta t}{2} - \frac{\Delta t^2}{12\tau} \tag{13}$$

The foregoing method of determining the zeroth order and first order moments and computing them in accordance with equations 10 and 11 should preferably be carried out over a sequence of discrete time gates $G_i'$ (FIG. 2) which continue until during at least two time gates only background indications, or counts, are detected. After the following method is carried out at one depth level of the borehole, the logging tool is moved to another depth interval and the process is carried out again to produce the desired log of the desired neutron decay characteristic as a function of the depth of the borehole.

Further, with reference to FIG. 2, decay curve 48 may be better properly characterized by two exponential components wherein the measured decay curve 48 is assumed to be the sum of two exponential decays—one relating to the formation decay and one relating to the borehole decay. In accordance with Equations 14, wherein A and B are the amplitudes of the formation and borehole signals respectively, at $t = t_o$ and $\tau_1$ and $\tau_2$ are the thermal neutron decay time constants associated with the formation and borehole, respectively.

$$f(t) = Ae^{-t/\tau_1} + Be^{-t/\tau_2} \text{ or} \tag{14}$$

$$N(t - t_o) = Ae^{-(t-t_o)/\tau_1} + Be^{-(t-t_o)/\tau_2}$$

The zeroth order moment N of a decay curve characterized by two exponential components is as set forth in Equation 15, and the first order moment M is as set forth in Equation 16.

$$N = \int_{t_0}^{\infty} N(t - t_0) dt = A\tau_1 + B\tau_2 \tag{15}$$

$$M = \int_{t_0}^{\infty} (t - t_0) N(t - t_0) dt = A\tau_1^2 + B\tau_2^2 \tag{16}$$

In order to obtain the thermal neutron decay characteristics of the borehole and surrounding earth formation, A and B, $\tau_1$ and $\tau_2$, it is preferable to define at least a first and second sequence of discrete time gates $G'$ in each irradiation interval, or depth level, wherein the first sequence of time gates begins at $t_o$ following a discrete time delay after the end of the neutron burst at $t = 0$ in said irradiation interval, and the second sequence of time gates begins following a discrete time delay, TD ($<< t_o$), after the beginning of the first sequence of time gates. Hereinafter, the first sequence of time gates will be referred to with the subscript E, and the second, later in time sequence of time gates will be denoted with the subscript L. The zeroth order moment of the first sequence of time gates is set forth in Equation 17 and the zeroth order moment of the second sequence of time gates is set forth in Equation 18.

$$N_E = \int_0^{\infty} Ae^{-t/\tau_1} dt + \int_0^{\infty} Be^{-t/\tau_2} dt = A\tau_1 + B\tau_2 \tag{17}$$

$$N_L = \int_0^{\infty} A'e^{-t/\tau_1} dt' + \int_0^{\infty} B'e^{-t/\tau_2} dt' = A'\tau_1 + B'\tau_2 \tag{18}$$

The first order moments of the first and second sequences of discrete time gates are set forth in Equations 19 and 20, respectively.

$$M_E = \int_0^\infty tAe^{-t/\tau_1} dt + \int_0^\infty tBe^{-t/\tau_2} dt = A\tau_1^2 + B\tau_2^2 \quad (19)$$

$$M_L = \int_0^\infty t'A'e^{-t'/\tau_1} dt' + \int_0^\infty t'B'e^{-t'/\tau_2} dt' = A'\tau_1^2 + B'\tau_2^2 \quad (20)$$

In the foregoing Equations, 17–20, the variable, t, has its origin 50 microseconds after the end of the neutron burst and t′ has its origin at the time, TD, after the neutron burst. Further, the amplitude components, A′ and B′, of the second sequence of discrete time gates, which appears in Equations 18 and 20, are defined by Equations 21 and 22.

$$A' = Ae^{-(TD-50)/\tau_1} \quad (21)$$

$$B' = Be^{-(TD-50)/\tau_2} \quad (22)$$

Equations 21 and 22 relate the amplitude components at the start of the second sequence of time gates to the amplitude components at the start of the first sequence of time gates. After substituting the values of A′ and B′ into Equations 18 and 20, the four transcendental Equations 17–20 have four unknown quantities, A, B, $\tau_1$ and $\tau_2$. From the fact that a good estimate of the value of $\tau_1$ and $\tau_2$ from the previous log depth interval, or previous depth frame, the zeroth and first order moments, $N_L$ and $M_L$ of the second sequence of time gates may be adjusted by a correction factor $K_1$ and $K_2$ in accordance with Equations 23 and 24 where the $\tau_1$ and $\tau_2$ values are those obtained in the most recent preceding depth interval computation.

$$K_1 = e^{-(TD-50)/\tau_1} \quad (23)$$

$$K_2 = e^{-(TD-50)/\tau_2} \quad (24)$$

Thus, combining the zeroth and first order moments of the indications, or counts, of the first sequence of time gates with the second sequence of time gates provides four equations, Equations 17, 19 and Equations 25 and 26.

$$N_L = K_1 A \tau_1 + K_2 B \tau_2 \quad (25)$$

$$M_L = K_1 A \tau_1^2 + K_2 B \tau_2^2 \quad (26)$$

The four equations, Equations 17, 19, 25 and 26, can be solved for $\tau_1$, $\tau_2$, A, and B, in accordance with equations 27 through 30, respectively.

$$\tau_1 = (M_L - K_2 M_E)/(N_L - K_2 N_E) \quad (27)$$

$$\tau_2 = (M_L - K_1 M_E)/(N_L - K_1 N_E) \quad (28)$$

$$A = \{(N_L - K_2 N_E)/(K_1 - K_2)\}/\tau_1 \quad (29)$$

$$B = \{(K_1 N_E - N_L)/(K_1 - K_2)\}/\tau_2 \quad (30)$$

With respect to tool 10, the zeroth order moments and first order moments $N_E$, $N_L$, $M_E$, and $M_L$, can be computed from the background, subtracted and dead time corrected gate counts, $G_i$ in a multi-sequence recording of the decay curve 48 in accordance with Equations 31 and 32, wherein $i_b$ is the first sequence of time gates containing only background and $i_o$ is the channel containing $t_o$, and where $\bar{t}_{oi}$ is determined by Equation 35 herein, and $\bar{t}_{oi}$ is approximated by Equation 36 herein, with $\bar{t}_{oi}$ substituted for $\bar{t}_{1i}$.

$$N_E = \sum_{i=i_0}^{i_b} G_i \quad (31)$$

$$M_E = \sum_{i=i_0}^{i_b} \bar{t}_{0i} G_i \quad (32)$$

The zeroth and first order moments of the second sequence of time gates can be computed from Equations 33 and 34 wherein $\bar{t}_{1i}$ is defined by Equation 35 and is approximated by Equation 36.

$$N_L = \sum_{i=i_1}^{i_b} G_i \quad (33)$$

$$M_L = \sum_{i=i_1}^{i_b} \bar{t}_{1i} G_i \quad (34)$$

$$\bar{t}_{1i} = \frac{\int_{t_i}^{t_i + \Delta t} (t - t_i) N(t - t_1) dt}{\int_{t_i}^{t_i + \Delta t} N(t - t_i) dt} \quad (35)$$

$$\bar{t}_{1i} \approx \frac{\bar{t}_1 A e^{-t_i/\tau_1} + \bar{t}_2 B e^{-t_i/\tau_2}}{A e^{-t_i/\tau_1} + B e^{-t_i/\tau_2}} \quad (36)$$

In Equations 35 and 36, $\bar{t}_1$ is obtained from Equation 12 herein with $\tau$ set to $\tau_1$, and $\bar{t}_2$ is similarly obtained with $\tau = \tau_2$.

A sequence may contain a non-integral number of gates. Gate count rates may be partitioned whenever a sequence boundary falls within a time gate. In the situation of partitioned gate count rates, the zeroth and first order moments, N and M, can be determined in accordance with Equations 37 and 38.

$$N = JG_a + \sum_{i=i_a+1}^{i_b-1} G_i + LG_b \quad (37)$$

$$M = JG_a \bar{t}_a + \sum_{i=i_a+1}^{i_b-1} \bar{t}_i G_i + LG_b \bar{t}_b \quad (38)$$

In Equations 37 and 38, J and L are partitioning fractions that account for the case where the sequence edges do not coincide with the gate edges. These values are evaluated assuming a decrease of count rate over the gate and that the sequence edge is some fraction of the gate width. The subscripts, a and b, refer to the starting and ending time gates in the sequence, respectively. Equations 37 and 38 apply to both the early sequence and the late sequence. Equations 37 and 38 further are applicable for decay curves 48 characterized by a single or double exponential.

The previously described method for determining thermal neutron decay characteristics characterized by two exponential components is only applicable when there is no background gamma ray count in the detector with no neutrons present in the borehole or formation, and where the data interval, or number of time gates stretches to infinity. Thus, the previously described method could be utilized if a neutron counter is utilized in logging tool 10 and the indications of the thermal neutron concentration in the borehole and surrounding earth formation are the number of neutrons counted by the neutron counter. Alternatively, if the length of the sequence of discrete time gates is 10 to 15 times as wide as the longest $\tau$ value expected from the solution to Equations 27, 28, 29 and 30, the previously described method could be utilized.

For data with background and/or spanning a finite time, such as a sequence of time gates extending less than five times the largest $\tau$ value, the method to be hereinafter described should be utilized to determine the thermal neutron decay characteristics of a borehole and the surrounding earth formation. In the description following $\tau_E$ and $\tau_L$ will be defined as being the single exponential solutions for the first and second sequences of discrete time gates, in accordance with Equation 8 herein. $\tau_1$ will be defined as the larger, or longer in time, component and $\tau_2$ will be the shorter, or lesser in time, component of the two exponential determination of Equations 27 and 28 herein.

In the method for determining thermal neutron decay characteristics of a borehole and the surrounding earth formation wherein background activity is present (interval III in FIG. 2), it is necessary to determine and remove the indications of such background radiation either by measuring it at a late enough point in time along the decay curve 48, or by extracting the background component from any remaining signal in accordance with any known conventional process for extracting the background activity. Preferably, as illustrated in FIG. 2, the first and second sequences of discrete time gates (intervals I and II) should not extend into the background region III of the decay curve 48. Further, experimentation has shown that the second sequence of discrete time gates should be delayed a number of microseconds which approximates two times $\tau_L$ after the neutron burst in order to make its determination of the thermal neutron decay characteristic more sensitive to the late component of the thermal neutron decay characteristic. The length of the second sequence of discrete time gates II, should approximate a time equal to three times $\tau_L$ in order to have a significant number of indications, or counts, of thermal neutron concentration toward the end of the second sequence of discrete time gates.

As shown in FIG. 2, the first sequence of discrete time gates $G_1'-G_4'$ begins at $t_o$ which is 50 microseconds after the end of the neutron burst, and preferably the second sequence of discrete time gates $G_3'-G_6'$ begins during the first sequence of discrete time gates. The value of $\tau_L$ used to set the delay interval TD for the second sequence of discrete time gates and to set or initialize, the widths of both the first and second sequences of discrete time gates is that computed from the second sequence of discrete time gates assuming that decay curve 48 is characterized by a single exponential which can be computed from Equation 8 herein.

In accordance with the foregoing, the width G of the first and second sequence of time gates I and II of FIG. 2 is defined by Equation 39.

$$G = 3\tau_L \quad (39)$$

This is done for reasons of mathematical convenience, but in another embodiment a shorter width for sequence of time gates I would be appropriate such as setting $G_I = 3\tau_2$, while $G_{II} = 3\tau_L$. The delay time TD is defined by either Equation 40 or 41, dependent upon whether or not $\tau_L$ is greater or lesser than 200 microseconds.

$$TD = 2\tau_L \text{ if } \tau_L \leq 200 \text{ } \mu s \quad (40)$$

$$TD = \tau_L + 200 \text{ if } \tau_L \geq 200 \text{ } \mu s \quad (41)$$

Because the widths of the first and second sequences of discrete time gates are finite in accordance with Equation 31, or in other words, the first and second sequences of discrete time gates have their latter portion truncated, it is necessary to select correction factors as a function of the length of the first and second sequences of discrete time gates and adjust the zeroth order and first order moments of the indications, or counts for each of the first and second sequences of time gates. The correction factors, as a function of the width G of the first and second sequences of discrete time gates, of: the first order moment or the long component; the long component of the zeroth moment; the short component of the first order moment; and the short component of the zeroth order moment, are set forth in Equations 42–45 respectively.

$$K_{11} = (1 - e^{-G/\tau_1}(1 + G/\tau_1)) \quad (42)$$

$$K_{12} = (1 - e^{-G/\tau_1}) \quad (43)$$

$$K_{21} = (1 - e^{-G/\tau_2}(1 + G/\tau_2)) \quad (44)$$

$$K_{22} = (1 - e^{-G/\tau_2}) \quad (45)$$

Additionally, the correction factors of Equations 23 and 24 are also utilized. Thus, the equations describing the zeroth order and first order moments of the first and second sequences of time gates are set forth in Equations 46–49.

$$N_E = K_{12}A\tau_1 + K_{22}B\tau_2 \quad (46)$$

$$N_L = K_1 K_{12} A\tau_1 + K_2 K_{22} B\tau_2 \quad (47)$$

$$M_E = K_{11}A\tau_1^2 + K_2 K_{21}B\tau_2^2 \quad (48)$$

$$M_L = K_1 K_{11} A\tau_1^2 + K_2 K_{21} B\tau_2^2 \quad (49)$$

The solutions for $\tau_1$, $\tau_2$, A, and B, are set forth in Equations 50–53.

$$\tau_1 = K_{12}(M_L - K_2 M_E)/K_{11}(N_L - K_2 N_E) \quad (50)$$

$$\tau_2 = K_{22}(M_L - K_1 M_E)/K_{12}(K_1 - K_2) \quad (51)$$

$$A = \{(N_L - K_2 N_E)/K_{12}(K_1 - K_2)\}/\tau_1 \quad (52)$$

$$B = \{(K_1 N_E - N_L)/K_{22}(K_1 - K_2)\}/\tau_2 \quad (53)$$

Insofar as the correction factors $K_{11}$, $K_{12}$, $K_{21}$, and $K_{22}$, are only weakly dependent on $\tau_1$ and $\tau_2$; and since previously obtained values for these correction factors from a prior depth interval are sufficiently accurate, only the correction factors $K_1$ and $K_2$ are ordinarily required to be recomputed in order to reduce errors and increase accuracy of the results.

Figure 3:
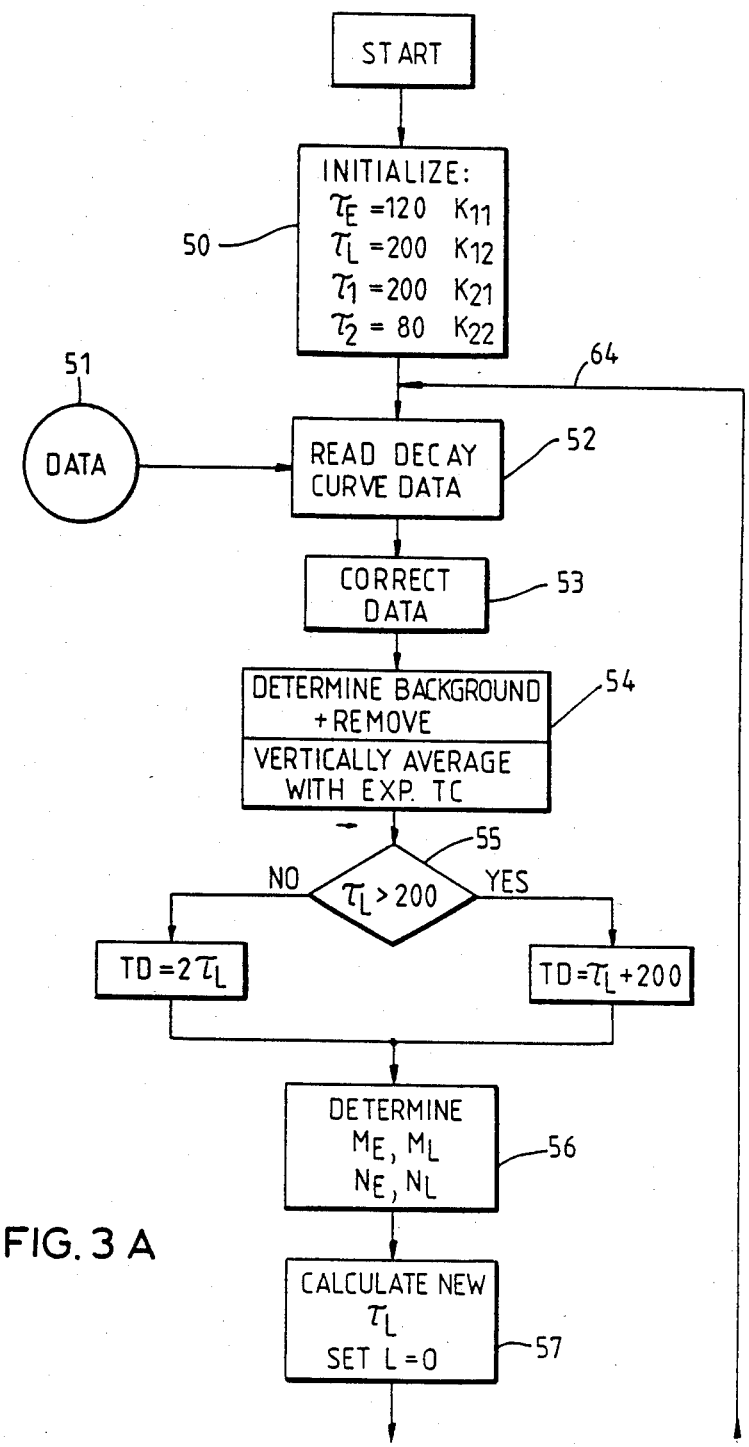
FIG. 3A and 3B are a generalized flow chart useful in programming a general purpose digital computer to carry out the computation procedures of the present invention.
Figure 3B:
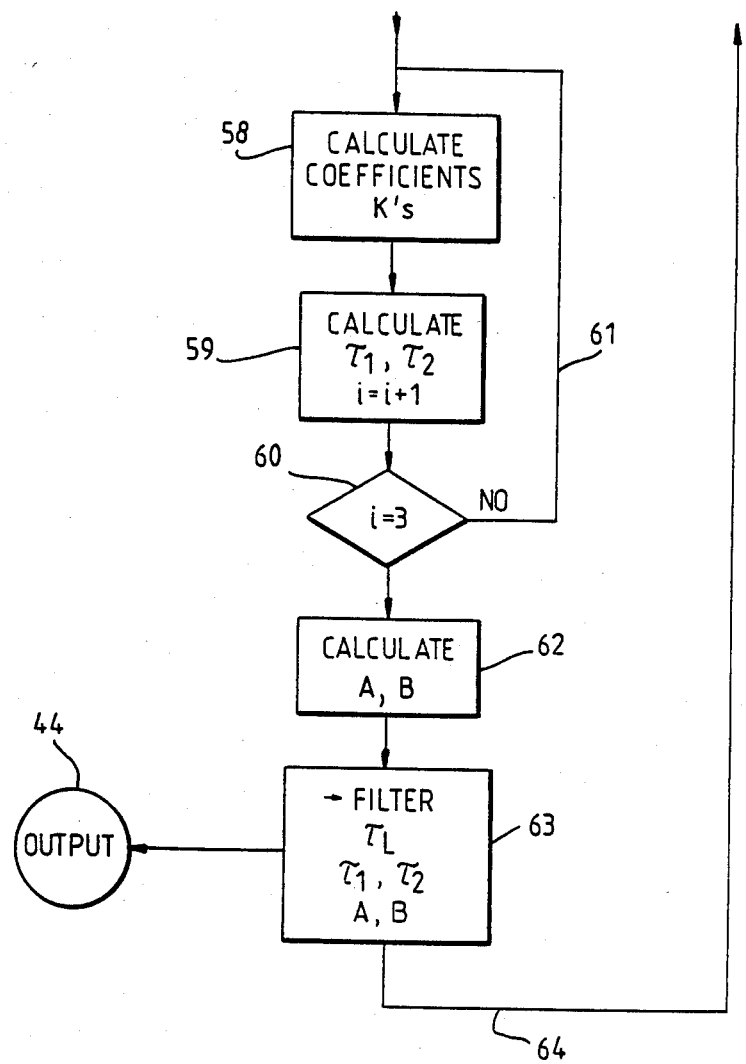

With reference now to FIGS. 3A and 3B, a generalized flow chart useful in programming a general purpose digital computer to carry out the previously described process will be described.

Initially default values for $\tau_E$, $\tau_L$, $\tau_1$, $\tau_2$, $K_{11}$, $K_{12}$, $K_{21}$, and $K_{22}$, are assumed, and correspond to the logging tool 10 being at the bottom of borehole 12. As shown in block 50 of FIG. 3A, the values of 120, 200, 200, and 80 are initially used for $\tau_E$, $\tau_L$, $\tau_1$, and $\tau_2$. Block 51 represents the data from logging tool 10, which are preferably the indications of the thermal neutron concentration in the formation, or number of counts, during the sequences of discrete time gates $G_i'$. The data are fed to element 52, which in turn reads the decay curve data, which then passes to element 53. Element 53 provides the correction for electronic dead time losses, since the electronic equipment utilized in the accumulation and transmission of pulses generated by the detectors 24, 26, in response to the detection of neutrons is not ideal. One expects, and indeed can quanitify, losses in detector count rates due to these electronic deficiencies. Once quantified, the count rate signals transmitted from the logging tool 10 to the processing circuitry can be corrected to make up for the dead time losses. The intricacies of these corrections will not be gone into here as they are conventional and well known. The dead time corrected data from element 53 are then transmitted to element 54 wherein, as previously described, the background signals are determined and removed. The data are filtered, or smoothed, by vertically averaging it with an exponential time constant, as is standard in the art.

The data then pass to logic element 55 which determines which value of the delay time TD is utilized for subsequent processing steps. If $\tau_L$ is greater than 200 microseconds, the value of the time delay is in accordance with Equation 41, previously set forth. If $\tau_L$ is less than 200 microseconds, Equation 40 is utilized for the delay time TD. The data are then transmitted to element 56, wherein the zeroth and first order moments, $N_E$, $N_L$, $M_E$, and $M_L$ are determined in accordance with Equations 37 and 38 as previously described.

The data are then transmitted to element 57 wherein $\tau_L$ is calculated in accordance with Equation 54.

$$\tau_L = \frac{M_L K_{11}}{N_L K_{12}} \quad (54)$$

The data are then transmitted to element 58 wherein the correction coefficients of Equations 23, 24, and 42–45 are calculated. $\tau_1$ and $\tau_2$ are then calculated in accordance with Equations 50 and 51 in element 59. As set forth in logic block 60, three iterations are performed to accurately determine the correction coefficients in element 58 and $\tau_1$ and $\tau_2$ in element 59. After three iterations of the data through elements 58, 59, and 60 via loop 61, the data are transmitted to element 62 wherein the amplitudes A and B are calculated pursuant to Equations 52 and 53, previously described.

The data are then transmitted to element 63, wherein a conventional filtering step is performed, which filtering step is optional to smooth the data. The data may be then transmitted as output from recorder 44, previously described. For the next depth level, $\tau_E$, $\tau_L$, $\tau_1$, $\tau_2$, and the correction coefficients determined in element 58 are transmitted through loop 64 and are utilized as the initial values in the next process steps which are performed to obtain $\tau_1$, $\tau_2$, A and B for the next depth level.

It is to be understood that the invention is not limited to the exact details of construction, operation, exact materials, or embodiment shown and described, as obvious modifications and equivalents will be apparent to one skilled in the art. Accordingly, the invention is therefore to be limited only by the scope of the appended claims.

We claim:

1. A method for determining a thermal neutron decay characteristic of an earth formation, comprising the steps of:
    (a) irradiating an earth formation with a discrete burst of fast neutrons;
    (b) detecting indications of the thermal neutron concentration in the formation during a sequence of discrete time gates, said sequence of time gates beginning following a discrete time delay after the end of the neutron burst;
    (c) determining the zeroth order moment of the indications during the sequence of discrete time gates;
    (d) determining the first order moment of the indications during the sequence of discrete time gates; and
    (e) forming a ratio of the first order moment of step (d) to the zeroth order moment of step (c) to obtain the thermal neutron decay time constant of the earth formation.

2. The method of claim 1, further including the step of forming a ratio of 4550 to the thermal neutral decay time constant of the earth formation to obtain the thermal neutron capture cross-section of the earth formation.

3. The method of claim 1, wherein the indications of thermal neutron concentration in the formation are counts obtained in a detector in a logging tool; the zeroth order moment of the counts is the total number of counts detected during the sequence of discrete time gates; and the first order moment of the counts is the sum, over the sequence of discrete time gates, of the product of the counts in each discrete time gate and the mean time of each respective time gate.

4. The method of claim 1, wherein the sequence of discrete time gates continues until during at least two time gates only background indications are detected.

5. A method for determining thermal neutron decay characteristics of a borehole and a surrounding earth formation, comprising the steps of:
    (a) irradiating the borehole and the surrounding earth formation with a discrete burst of fast neutrons during each of a succession of irradiation intervals;
    (b) detecting indications of the thermal neutron concentration in the borehole and formation during at least a first and second sequence of discrete time gates in each irradiation interval, said first sequence of time gates beginning following a discrete time delay after the end of the neutron burst in said irradiation interval, and said second sequence of time gates beginning following a discrete time delay after the beginning of the first sequence of time gates;
    (c) determining the zeroth order moments of the indications for each of the at least first and second sequences of time gates;
    (d) determining the first order moments of the indications for each of the at least first and second sequences of time gates;
    (e) adjusting the zeroth and first order moments of the indications for the second sequence of time gates by a correction factor determined from a preceding irradiation interval; and
    (f) combining the zeroth and first order moments of the indications of the first sequence of time gates with the adjusted zeroth and first order moments of the indications of the second sequence of time gates according to a series of equations to obtain the thermal neutron decay characteristics of the borehole and surrounding earth formation.

6. The method of claim 5, wherein the indications of thermal neutron concentration in the borehole and surrounding earth formation are the number of neutrons counted by a neutron counter disposed in the borehole; the zeroth order moments are the total number of neutrons counted during each of the first and second sequences of discrete time gates; and the first order moments are the sum, over each of the first and second sequences of discrete time gates, of the product of the number of neutrons counted in each time gate and the mean time of each respective time gate.

7. The method of claim 5, wherein the second sequence of discrete time gates begins during the first sequence of discrete time gates.

8. The method of claim 5, wherein the characteristics obtained are: the thermal neutron decay time constants associated with the borehole and the surrounding earth formation; and the number of neutrons per microsecond associated with the borehole and the surrounding earth formation.

9. A method for determining thermal neutron decay characteristics of a borehole and a surrounding earth formation, comprising the steps of:
(a) irradiating the borehole and the surrounding earth formation with a discrete burst of fast neutrons during each of a succession of irradiation intervals;
(b) detecting indications of the thermal neutron concentration in the borehole and formation during at least a first and second sequence of discrete time gates in each irradiation interval, said first sequence of time gates beginning following a discrete time delay after the end of the neutron burst in said irradiation interval, and said second sequence of time gates beginning following a discrete time delay after the beginning of the first sequence of time gates;
(c) determining and removing manifestations of background radiation from the at least first and second sequences of time gates;
(d) determining the zeroth order moments of the indications for each of the at least first and second sequences of time gates;
(e) determining the first order moments of the indications for each of the at least first and second sequences of time gates;
(f) selecting correction factors as a function of the length of the first and second sequences of discrete time gates and adjusting the zeroth order and first order moments of steps (d) and (e) by said correction factors; and
(g) combining the adjusted zeroth and first order moments of the indications of the first and second sequences of discrete time gates according to a series of equations to obtain the thermal neutron decay characteristics of the borehole and surrounding earth formation.

10. The method of claim 9, wherein the indications of thermal neutron concentration in the borehole and surrounding earth formation are counts obtained in a detector in a logging tool; the zeroth order moment of the counts for the first and second sequences of time gates is the total number of counts detected during each sequence of discrete time gates; and the first order moment of the counts for the first and second sequences of time gates is the sum, over all the time gates of each sequence, of the product of the counts in each discrete time gate and the mean time of each respective time gate.

11. The method of claim 9, wherein the second sequence of discrete time gates begins during the first sequence of discrete time gates.

12. The method of claim 11, wherein the characteristics obtained are: the thermal neutron decay time constants associated with the borehole and the surrounding earth formation; and the number of counts per microsecond associated with the borehole and the surrounding earth formation.

13. The method of claim 9, wherein the lengths of the first and second sequences of discrete time gates are substantially the same and are approximately equal to three times the thermal neutron decay time constant for the second sequence of discrete time gates.

14. The method of claim 9, wherein the length of the first sequence of time gates is approximately equal to three times the thermal neutron decay time constant associated with the borehole, and the length of the second sequence of discrete time gates is approximately equal to three time the thermal neutral decay time constant for the second sequence of discrete time gates.

15. The method of claim 9, wherein the second sequence of discrete time gates is begun after the passing of approximately two times the thermal neutron decay time constant after the discrete burst of fast neutrons.

16. An apparatus for determining a thermal neutron decay characteristic of an earth formation, comprising:
(a) means for irradiating an earth formation with a discrete burst of fast neutrons;
(b) means for detecting indications of the thermal neutron concentration in the formation during a sequence of discrete time gates, said sequence of time gates beginning following a discrete time delay after the end of the neutron burst;
(c) means for determining the zeroth order moment of the indications during the sequence of discrete time gates;
(d) means for determining the first order moment of the indications during the sequence of discrete time gates; and
(e) means for forming a ratio of the first order moment of step (d) to the zeroth order moment of step (c) to obtain the thermal neutron decay time constant of the earth formation.

17. An apparatus for determining thermal neutron decay characteristics of a borehole and a surrounding earth formation, comprising:
(a) means for irradiating the borehole and the surrounding earth formation with a discrete burst of fast neutrons during each of a succession of irradiation intervals;
(b) means for detecting indications of the thermal neutron concentration in the borehole and formation during at least a first and second sequence of discrete time gates in each irradiation interval, said first sequence of time gates beginning following a discrete time delay after the end of the neutron burst in said irradiation interval, and said second sequence of time gates beginning following a discrete time delay after the beginning of the first sequence of time gates;

(c) means for determining the zeroth order moments of the indications for each of the at least first and second sequences of time gates;

(d) means for determining the first order moments of the indications for each of the at least first and second sequences of time gates;

(e) means for adjusting the zeroth and first order moments of the indications for the second sequence of time gates by a correction factor determined from a preceding irradiation interval; and (f) means for combining the zeroth and first order moments of the indications of the first sequence of time gates with the adjusted zeroth and first order moments of the indications of the second sequence of time gates according to a series of equations to obtain the thermal neutron decay characteristics of the borehole and surrounding earth formation.

18. An apparatus for determining thermal neutron decay characteristics of a borehole and a surrounding earth formation, comprising:

(a) means for irradiating the borehole and the surrounding earth formation with a discrete burst of fast neutrons during each of a succession of irradiation intervals;

(b) means for detecting indications of the thermal neutron concentration in the borehole and formation during at least a first and second sequence of discrete time gates in each irradiation interval, said first sequence of time gates beginning following a discrete time delay after the end of the neutron burst in said irradiation interval, and said second sequence of time gates beginning following a discrete time delay after the beginning of the first sequence of time gates;

(c) means for determining and removing manifestations of background radiation from the at least first and second sequences of time gates;

(d) means for determining the zeroth order moments of the indications for each of the at least first and second sequences of time gates;

(e) means for determining the first order moments of the indications for each of the at least first and second sequences of time gates;

(f) means for selecting correction factors as a function of the length of the first and second sequences of discrete time gates and adjusting the zeroth order and first order moments of steps (d) and (e) by said correction factors; and (g) means for combining the adjusted zeroth and first order moments of the indications of the first and second sequences of discrete time gates according to a series of equations to obtain the thermal neutron decay characteristics of the borehole and surrounding earth formation.

19. A method for determining a thermal neutron decay characteristic of an earth formation, comprising the steps of:

(a) irradiating an earth formation with a discrete burst of fast neutrons;

(b) detecting indications of the thermal neutron concentration in the formation during at least one discrete time gate, said at least one discrete time gate beginning following a discrete time delay after the end of the neutron burst, said indications comprising counts obtained in a detector in a logging tool;

(c) determining the zeroth order moment of the indications during the at least one discrete time gate by summing the total number of counts detected during the at least one discrete time gate;

(d) determining the first order moment of the indications during the at least one discrete time gate by summing the times of occurrence of the counts detected during the at least one discrete time gate; and (e) forming a ratio of the first order moment of step (d) to the zeroth order moment of step (c) to obtain the thermal neutron decay time constant of the earth formation.

20. A method for determining thermal neutron decay characteristics of a borehole and a surrounding earth formation, comprising the steps of:

(a) irradiating the borehole and the surrounding earth formation with a discrete burst of fast neutrons during each of a succession of irradiation intervals;

(b) detecting indications of the thermal neutron concentration in the borehole and formation during at least a first and second discrete time gate in each irradiation interval, said first time gate beginning following a discrete time delay after the end of the neutron burst in said irradiation interval, and said second time gate beginning following a discrete time delay after the beginning of the first time gate, said indications comprising counts obtained in a detector in a logging tool;

(c) determining the zeroth order moments of the indications for each of the at least first and second time gates by summing the total number of counts detected during each of the at least first and second time gates;

(d) determining the first order moments of the indications for each of the at least first and second time gates by summing the times of occurrence of the counts detected during each of the at least first and second time gates;

(e) adjusting the zeroth and first order moments of the indications for the second time gate by a correction factor determined from a preceding irradiation interval; and (f) combining the zeroth and first order moments of the indications of the first time gate with the adjusted zeroth and first order moments of the indications of the second time gate according to a series of equations to obtain the thermal neutron decay characteristics of the borehole and surrounding earth formation.

21. A method for determining thermal neutron decay characteristics of a borehole and a surrounding earth formation, comprising the steps of:

(a) irradiating the borehole and the surrounding earth formation with a discrete burst of fast neutrons during each of a succession of irradiation intervals;

(b) detecting indications of the thermal neutron concentration in the borehole and formation during at least a first and second discrete time gate in each irradiation interval, said first time gate beginning following a discrete time delay after the end of the neutron burst in said irradiation interval, and said second time gate beginning following a discrete time delay after the beginning of the first time gate, said indications comprising counts obtained in a detector in a logging tool;

(c) determining and removing manifestations of background radiation from the at least first and second time gates;

(d) determining the zeroth order moments of the indications for each of the at least first and second time gates by summing the total number of counts detected during each of the at least first and second time gates;

(e) determining the first order moments of the indications for each of the at least first and second time gates by summing the times of occurrence of the counts detected during each of the at least first and second time gates;

(f) selecting correction factors as a function of the length of the first and second discrete time gates and adjusting the zeroth order and first order moments of steps (d) and (e) by said correction factors; and (g) combining the adjusted zeroth and first order moments of the indications of the first and second discrete time gates according to a series of equations to obtain the thermal neutron decay characteristics of the borehole and surrounding earth formation.

* * * * *